(12) United States Patent
Falk et al.

(10) Patent No.: US 7,580,973 B2
(45) Date of Patent: Aug. 25, 2009

(54) METHOD FOR LOADING, STORING AND PRESENTING WEB PAGES

(75) Inventors: Dorte Falk, Wolfenbuettel (DE); Stefan Lux, Meine (DE); Dietmar Peters, Braunschweig (DE); Carsten Schnier, Salzgitter (DE); Uwe Heidemann, Altenbeken (DE); Rolf Feldmann, Porta Westfalica (DE)

(73) Assignee: Volkswagen AG, Wolfsburg (DE)

( * ) Notice: Subject to any disclaimer, the term of this patent is extended or adjusted under 35 U.S.C. 154(b) by 608 days.

(21) Appl. No.: 10/432,690

(22) PCT Filed: Oct. 30, 2001

(86) PCT No.: PCT/EP01/12528

§ 371 (c)(1),
(2), (4) Date: Mar. 4, 2004

(87) PCT Pub. No.: WO02/42932

PCT Pub. Date: May 30, 2002

(65) Prior Publication Data

US 2004/0143668 A1 Jul. 22, 2004

(30) Foreign Application Priority Data

Nov. 27, 2000 (DE) ................................ 100 58 849

(51) Int. Cl.
*G06F 15/16* (2006.01)
(52) U.S. Cl. ........................ 709/203; 709/217; 709/223
(58) Field of Classification Search ................. 709/203, 709/206, 207, 217, 223
See application file for complete search history.

(56) References Cited

U.S. PATENT DOCUMENTS

| 6,061,715 | A | | 5/2000 | Hawes ........................ 709/203 |
| 6,105,028 | A | * | 8/2000 | Sullivan et al. ............... 707/10 |
| 6,763,459 | B1 | * | 7/2004 | Corella ....................... 713/156 |

(Continued)

FOREIGN PATENT DOCUMENTS

WO WO 99/04345 1/1999

(Continued)

OTHER PUBLICATIONS

W. Friedmann: "Getting ready for Internet Explorer 5: Tips for Web Site Authors"; MSDN Library>Internet Explorer, XP-002254064, Mar. 8, 1999.

(Continued)

*Primary Examiner*—Salad Abdullahi
*Assistant Examiner*—El Hadji M Sall
(74) *Attorney, Agent, or Firm*—King & Spalding L.L.P.

(57) ABSTRACT

The invention relates to a method for loading, storing and presenting web pages, by which means the required band widths and the time taken to load web pages for an application are reduced. To this end, components or information elements separate from web pages are provided with indicators by which means the expiry dates can be deduced. The indicators are evaluated by the application which may be a browser. In this way, the application can reload only the updated data/components from the original source. Information elements which are constant over a long period of time can be completed or loaded by the application from a memory associated with the same. The loading times and data quantities for a data transmission from an original source to an application can thus be considerably reduced. The invention also relates to an information system which uses said method, preferably in a motor vehicle.

12 Claims, 3 Drawing Sheets

U.S. PATENT DOCUMENTS 6,883,020 B1 * 4/2005 Taranto et al. .............. 709/213

FOREIGN PATENT DOCUMENTS

| WO | WO 99/05616 | 2/1999 |
|---|---|---|
| WO | WO 99/22301 | 5/1999 |

OTHER PUBLICATIONS

Berners-Lee T. et al.: "Hypertext Transfer Protocol—HTTP/1.0"; Network Working Group; XP-02061292, May 1, 1996.

"Conditional Hypertext Mark-Up Language Tags to Dynamically Change Web Pages"; IBM Technical Disclosure Bulletin, IBM Corp., Nov. 1, 1996.

* cited by examiner

METHOD FOR LOADING, STORING AND PRESENTING WEB PAGES

BACKGROUND OF THE INVENTION

The invention relates to a method for loading, storing and presenting an information display, especially an Internet web page.

The Internet has become an important tool for getting information quickly and for using services, with the transmission rates for fixed network connections becoming increasingly faster, as is the case for a great majority of users since the widespread introduction of DSL data transmission technology, for example.

But the mobile segment will also use the range of information and services increasingly in the future, with new transmission techniques such as GPRS, UMTS, CDMA and HSCSD ensuring that mobile applications and subscribers can be provided with the necessary bandwidth. However, as the number of users in the mobile radio segment increases, the loading time for web pages from the Internet will increase and in some cases reach its limits, even with a high bandwidth availability in a mobile radio cell. In addition, there will continue to be network segments that only provide limited bandwidth, such as in GSM networks, so that loading of content from the Internet takes a long time.

Many web pages that are accessed by a user are web pages that are visited frequently or regularly. These web pages generally contain graphics, updated information, and the like. Many data items that are loaded during a repeated access are identical to such data items in web pages that have previously been loaded, yet all of the data items of a web page are loaded anew every time a web page, even the same web page, is accessed.

A number of optimization possibilities are used currently to shorten loading times of web pages or content from the Internet, for example the use of frames, wherein one web page can be embedded within another, or the use of the conventional cache memory of a browser. The use of frames makes it possible to reduce the screen area to be loaded anew, with the result that the quantity of data to be loaded in this frame does not require reloading of the entire screen contents. Cache memory makes it possible to temporarily store complete web pages, even web pages in frames, during use. When the same web page is accessed again, it can be loaded from the cache memory, and thus requires no Internet access, no data transfer and also does not burden bandwidth. So that it is still possible to update web pages once they have been stored in the cache memory, an expiration time can be specified for a complete web page. If repeated access is requested to a web page that is stored in the cache and whose expiration time has elapsed, the browser automatically loads the complete web page from the Internet again. Another possibility for updating the web page is the use of the usual page update function of a browser, which triggers new loading of the web page regardless of the expiration time.

EP-A-0 813 159 describes a method wherein each individual component or information element of a web page is assigned a priority that is composed of a natural or whole number. Using the priority of the individual information elements, the browser loading the web page creates a priority list and loads the high priority information elements first. As a result, the user receives important information sooner than less important information, such as the banner information. Information elements with no priority are treated as priority "0". However, the time for assembling the web page as a whole is not reduced in this method.

In mobile applications, it is necessary to use the above-mentioned optimization possibilities because of the narrow bandwidth for two reasons. Firstly, doing so reduces the necessary bandwidth, resulting in faster loading of the web page, and secondly, it is more economical for the user to load less data since he most likely will have to pay for the amounts of data actually loaded with future transmission methods.

Consequently, the object of the invention is to create a method and an apparatus for loading, storing and presenting content, in particular web pages, from a computer network that makes information or data available, in particular the Internet, which optimizes the loading of the data from the network.

SUMMARY OF THE INVENTION

In the method according to the invention for loading, storing and presenting accessible information from a computer network on the part of a subscriber who is connected to the computer network at least some of the time, wherein a loadable information unit consisting of one or more information elements is loaded, stored and displayed by the subscriber. A marker is assigned to each information element or to the information elements that change over the course of time, the marker representing a time duration for the validity of the content of the information element in question. The marked information elements are loaded from the computer network by the subscriber and stored. The markers of the information elements are evaluated by the subscriber, and information elements whose validity has expired are reloaded from the computer network and stored. The loadable information unit is assembled from the information elements stored at the subscriber and those loaded anew from the computer network, and displayed.

The use of markers on the individual information elements of an information unit, from which the validity period or expiration time of the information element in question can be derived, results in a significantly reduced need for access to the computer network, preferably over the Internet, thus reducing waiting times. The markers preferably involve direct specification of the validity period or expiration time. The markers can also involve a priority level for the expiration time or validity period, where the priority is used to establish an expiration time. An information element of a loadable information unit is defined in particular as a separate graphic, a separate text, a separate applet, or a separate formatting instruction. A loadable information unit preferably takes the form of a web page and the subscriber preferably takes the form of an application, for example a browser. Specifically, in the case of a web page, the information elements are the elements of which the page is composed.

The application preferably has an evaluation unit for evaluating the markers wherein the result of the evaluation for each information element of the loadable information unit determines the point in time when a new loading of the relevant information element must take place. In this regard, a marker of an information element can in particular take the form of a metatag or attribute.

Preferably the information elements of the loadable information unit are stored individually with their markers in a memory, such as the cache memory of the browser. This achieves the result that an information element to be loaded anew can be written in place of the preceding information element, thus simplifying the assembly of the information unit, in particular the web page.

Connection to the computer network can be accomplished over a fixed network or a mobile radio network.

The information system in accordance with the invention for carrying out the method described above may include an antenna and may be connected, at least some of the time, to the Internet by a mobile radio network. The browser is preferably contained in the information system. Moreover, the information system can have a CAN interface for connection to a display screen.

In particular, an information system of this nature is used in a motor vehicle, wherein the motor vehicle has a CAN-capable TV device to which the information system is connected.

A preferred embodiment of the invention is explained below with reference to the drawings.

DESCRIPTION OF THE INVENTION

Figure 1:
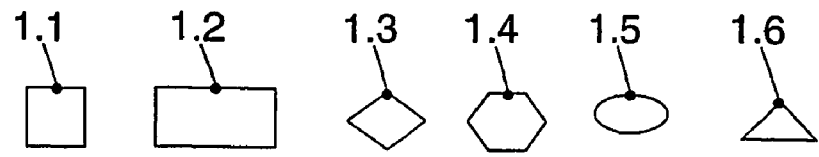
FIG. 1 shows the graphic symbols used for individual information elements.

The graphic elements 1.1 to 1.6 shown in FIG. 1 symbolically represent various separate components or information elements of a web page. Information elements 1.1 and 1.2 are meant to be items of information, i.e. data, that are subject to short modification cycles and thus have a correspondingly short expiration time (for example, 2 seconds). The information elements 1.3, 1.4, 1.5 and 1.6 are meant to be components of a web page that can be found unchanged on the page for a relatively long time and have a correspondingly long expiration time (for example, 10 days).

Figure 2:
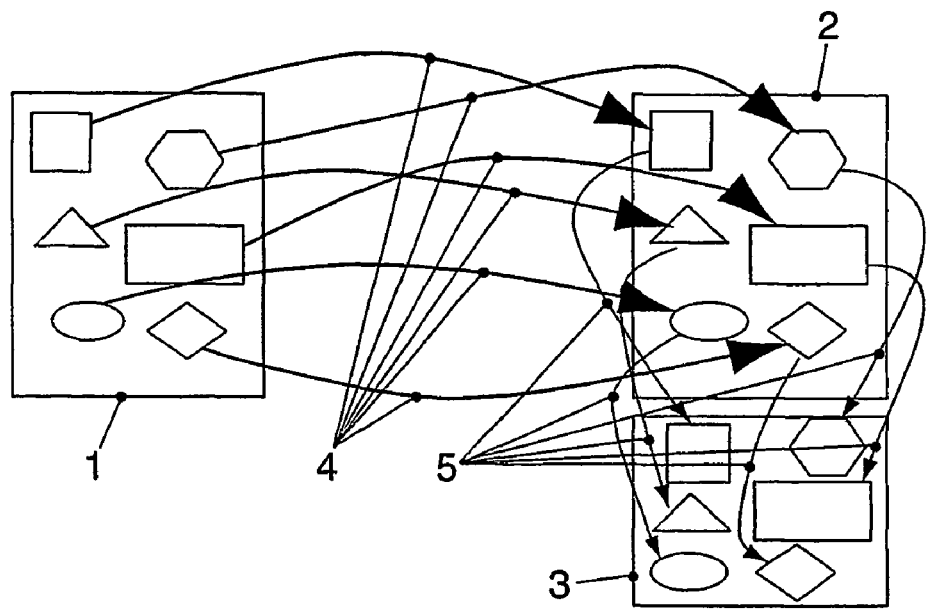
FIG. 2 shows the initial loading of a web page in an application.

FIG. 2 shows the first time a web page 1, consisting of the information elements 1.1-1.6 as described in FIG. 1, is loaded. An application 2, for example a browser, uses a loading process 4 to load the components of the web page 1, and displays them. In addition, the individual components or information elements 1.1-1.6 and their expiration times are stored, separately, in a memory 3 allocated to the application 2, by a storage process 5. In this starting situation, it is not possible to save loading time for assembling the web page 1 in the application 2.

Figure 3:
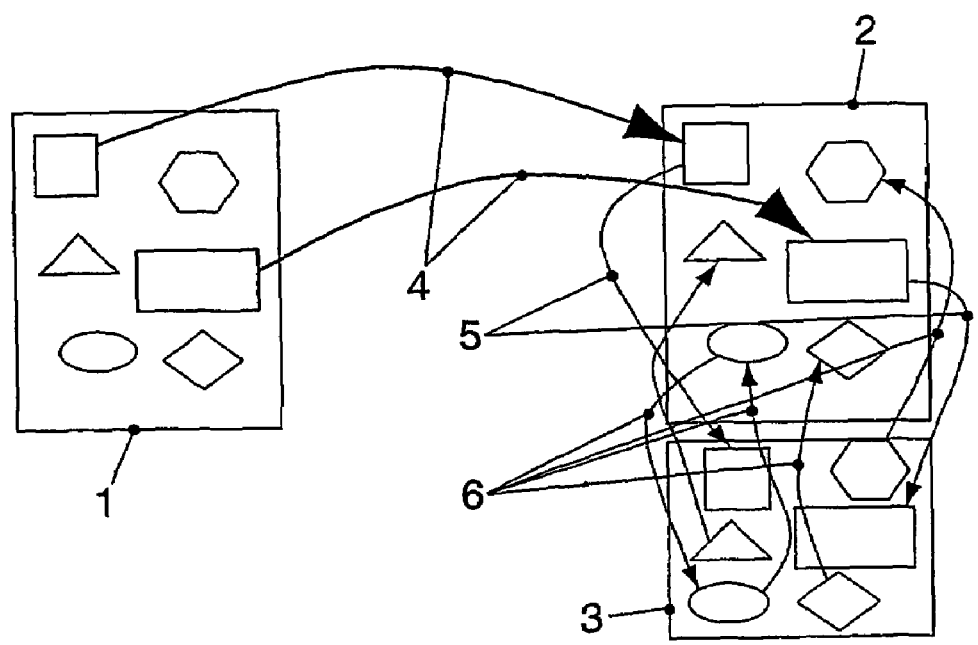
FIG. 3 shows reloading of individual information elements of the web page.

FIG. 3 shows the process of an update of the web page 1 loaded in FIG. 1. The application 2 loads the web page 1 again at a later time, for example 5 hours after the first loading. In this new access, however, only the components 1.1 and 1.2 are loaded by the loading process 4, since their expiration times have been exceeded. The expiration times for all other components have not yet been exceeded, and the application 2 can thus assume that the information elements are still current. Here too, as in FIG. 2, the newly loaded/current information elements 1.1 and 1.2 are again written to the memory 3 by a storage process 5, where the corresponding previous information elements are overwritten. So that the application 2 can display the complete web page, the remaining components 1.3, 1.4, 1.5 and 1.6, whose expiration time has not yet been reached, are additionally loaded from the memory 3 allocated to the application by a loading process 6. If the web page is accessed again after the expiration time of one of the information elements 1.3-1.6 with a long validity period has elapsed, then it too will be loaded anew.

Some examples should make the logic of this method clear. A company logo on a web page can be a graphic with a data size of 10 Kbytes, for example. Since it seldom changes, a very long expiration time (for example, 100 days) can be specified for it. At the same time, the web page can contain extremely topical, variable text content with an expiration time of 10 seconds, for example. The important thing to the user is the topical information, but at the same time he does not want to do without the attractively designed web portions. Using the prior art method, if both content items are located on the same web page, the user must always load the 10 Kbytes of the company logo anew, even though this content has not changed at all. Therefore, depending on the bandwidth, he wastes time for longer loading and money for unnecessarily transmitted amounts of data.

As already mentioned above, the separate components of a web page with individual expiration times consist, for example, of repeating graphics, texts, applets or page formatting information. This method has especially beneficial effects when identical graphics occur repeatedly on different web pages. For example, this could be a weather map with political map graphics and graphics for sun, clouds, rain clouds, etc. on a web page. In accordance with the present invention, updating of a weather map would then mean that only the positioning data for placement of the graphic symbols on the political map would need to be transmitted as long as all the graphics had already been loaded once and were provided with an adequately long expiration time. The amount of data to be loaded would be reduced to a fraction of what existing solutions require. The display of weather maps for various countries would require only that the political map be loaded once, and the positional data for the weather symbols repeatedly.

An interesting application of the method according to the invention is the more or less central preparation of web page components for an extremely wide variety of applications in the network (web), with a separate web address (URL) for each of these web page components. These URLs could then be used on a wide variety of web pages instead of separate symbols or graphics. As a result, the loading and storage mechanism for the underlying invention would extend over broad portions of the net and over a variety of web pages. The result would be enormous potential savings of bandwidth and loading time in the mobile network as well as for fixed network applications.

Figure 4:
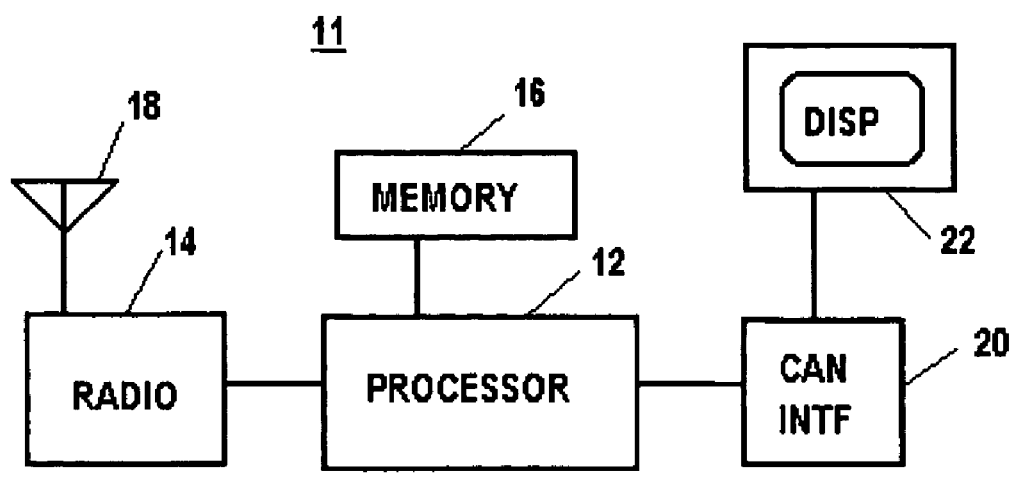
FIG. 4 is a block diagram showing an exemplary embodiment of an apparatus for practicing the invention.

Referring to FIG. 4 there is shown an exemplary arrangement of an apparatus for practicing the present invention. The apparatus of FIG. 4 may be installed, for example, in an automobile or other motor vehicle. A processor 12 is operated in conjunction with a memory 16 in which a program and other data may be stored. The processor operates data communications radio 14 having antenna 18 to communicate with a remote server, for example using a cellular telephone network or similar communications system. Data to be displayed is provided via CAN interface 20 to display 22, which in a preferred embodiment may be a television monitor.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

The invention claimed is:

1. A method for downloading from a computer network and displaying at a subscriber unit a web page comprising a plurality of information elements, comprising:

providing marker data for each of said information elements of said web page which are subject to change over time, said markers specifying an expiration time or a validity period of said information elements, wherein an expiration time indicates a time up to which said information element is valid and said validity period indicates a time range for which an information element is valid;

downloading a first web page including said markers to said subscriber unit and storing said information elements and markers;

using an evaluation unit provided by an application on said subscriber unit, evaluating said markers to identify information elements which are not valid and to determine a time for further downloading information elements for each information element of the loadable web page;

further downloading information elements corresponding to said information elements identified as not valid; and assembling and displaying an updated web page comprising stored valid information elements of said first web page and said further downloaded information elements.

2. A method in accordance with claim 1, wherein the marker further comprises a priority level for said expiration time or said validity period.

3. A method in accordance with claim 1 wherein he computer network is the Internet.

4. A method in accordance with claim 1, wherein at least some of the information elements of a loadable web page each comprise one of a separate graphic, a separate text, a separate applet and a separate formatting instruction.

5. A method in accordance with claim 1, wherein said markers takes the form of one of a metatag and an attribute.

6. A method in accordance with claim 1 wherein the information elements are separately stored with their markers in a memory.

7. A method in accordance with claim 6, wherein said memory comprises a cache memory of a browser.

8. A method in accordance with claim 1 wherein said subscriber is connected to the computer network using one of a wired network or a radio network.

9. An information system comprising:
a radio module, an antenna and a processor;
a display screen; and
an application;
wherein said processor is arranged to operate said radio module to connect said processor to the internet; and
wherein said processor is further arranged to download from the Internet and display on said display screen a web page comprising a plurality of information elements by:
providing marker data for each of said information elements of said web page which are subject to change over time said markers specifying an expiration time or a validity period of said information elements, wherein an expiration time indicates a time up to which said information element is valid and said validity period indicates a time range for which an information element is valid;

downloading a first web page including said markers to said information system and storing said information elements and markers;

using an evaluation unit provided by said application, evaluating said markers to identify information elements which are not valid and to determine a time for further downloading information elements for each information element of the loadable web page;

further downloading information elements corresponding to said information elements identified as not valid; and assembling and displaying on said display screen an updated web page comprising stored valid information elements of said first web page and said further downloaded information elements.

10. An information system in accordance with claim 9, wherein the processor includes a browser.

11. An information system in accordance with claim 9, wherein the information system has a controller area network (CAN) interface for connection to the display screen.

12. A motor vehicle, comprising:
a controller area network (CAN)-capable monitor device; and
an information system connected to the CAN-capable monitor device, the information system comprising:
a radio module, an antenna and a processor; and
an application;
wherein said processor is arranged to operate said radio module to connect said processor to the internet; and
wherein said processor is further arranged to download from the Internet and display on said CAN-capable monitor device a web page comprising a plurality of information elements by:
providing marker data for each of said information elements of said web page which are subject to change over time, said markers specifying an expiration time or a validity period of said information elements, wherein an expiration time indicates a time up to which said information element is valid and said validity period indicates a time range for which an information element is valid;

downloading a first web page including said markers to said information system and storing said information elements and markers;

using an evaluation unit provided by said application, evaluating said markers to identify information elements which are not valid and to determine a time for further downloading information elements for each information element of the loadable web page;

further downloading information elements corresponding to said information elements identified as not valid; and assembling and displaying on said CAN-capable monitor device an updated web page comprising stored valid information elements of said first web page and said further downloaded information elements.

* * * * *